H. G. W. OTT.
MECHANISM FOR REGULATING FLOW OF LIQUIDS.
APPLICATION FILED JUNE 14, 1910.
1,060,554.
Patented Apr. 29, 1913.
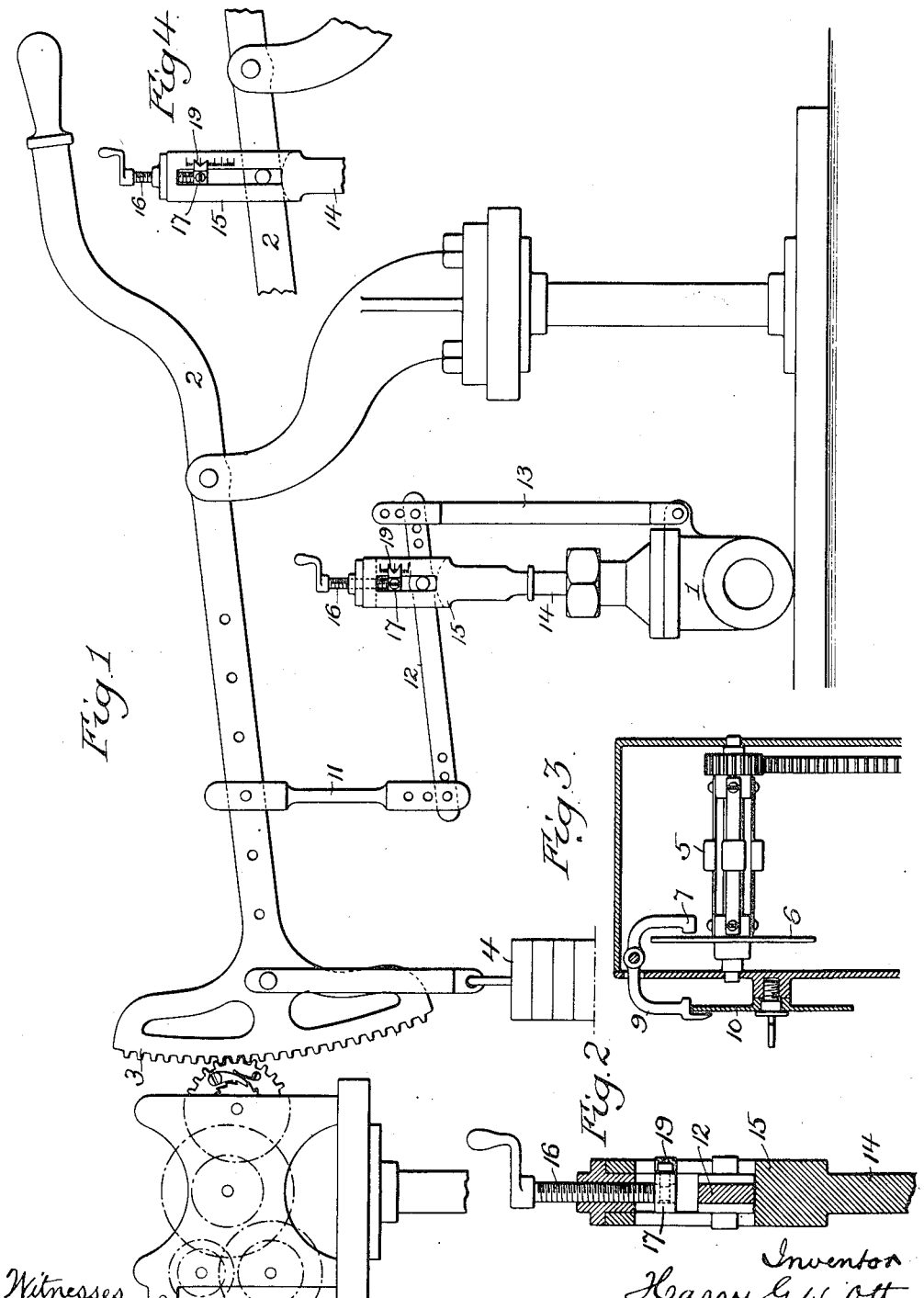

UNITED STATES PATENT OFFICE.

HARRY G. W. OTT, OF PHILADELPHIA, PENNSYLVANIA.

MECHANISM FOR REGULATING FLOW OF LIQUIDS.

1,060,554.  Specification of Letters Patent.  Patented Apr. 29, 1913.

Application filed June 14, 1910.   Serial No. 566,876.

*To all whom it may concern:*

Be it known that I, HARRY G. W. OTT, a citizen of the United States, residing in Philadelphia, Pennsylvania, have invented certain Improvements in Mechanism for Regulating Flow of Fluids, of which the following is a specification.

The object of my invention is to provide simple and efficient mechanism for regulating the flow of fluids and cutting off said flow after it has continued for a predetermined time. This object I attain in the manner hereinafter set forth, reference being had to the accompanying drawing, in which—

Figure 1 is a side view of apparatus constructed in accordance with my invention; Fig. 2 is an enlarged transverse section of that portion of the apparatus which coöperates with the valve stem; Fig. 3 is an enlarged transverse section of part of the escapement device, and Fig. 4 is a side view illustrating a modification of my invention.

In the drawing, 1 represents a valve of any suitable character for governing the flow of air, water, oil, or other fluid, the valve selected for illustration being one of the sliding gate type. The opening of this valve is effected by depressing the outer end of a lever 2 and thereby raising a toothed sector 3 at the inner end of the lever, movement of the lever in the opposite direction to cause closing of the valve being effected by a weight 4 hung to and depending from the lever 2.

The sector 3 is in mesh with the first of a train of gears constituting an escapement device, said first gear wheel being connected to the next gear wheel of the train by any suitable form of ratchet and pawl device, whereby, when the sector 3 rises, it will operate only the first gear but, when it descends, the movement of said first gear will be transmitted to the other gears of the train. The last shaft of the gear train may be provided with any suitable form of retarding device for regulating its speed of motion. It may, for instance, have a centrifugal governor 5 acting to impart side movement to a disk 6 with which coöperates a brake shoe 7 carried by a lever 9 which is acted upon by a cam disk 10 whereby the brake shoe may be moved nearer to or farther from the disk 6 when the same is in its position of rest. (See Fig. 3.)

The lever 2 is connected by a link 11 to another lever 12 which is pivotally mounted upon a link 13 hung to the casing of the valve 1, and a given movement of the lever 2 may serve to open the valve 1 either fully or to a lesser extent, depending upon the adjustment of the links 11 or 13, or both, nearer to or farther from the point of connection of the lever 12 with the valve stem, openings being provided in the levers 2 and 12 for the purpose of effecting such adjustment. In order, however, to provide a finer adjustment than can thus be effected, I arrange for a certain amount of lost motion of the lever 12 in respect to the valve stem 14 in the following manner: The valve stem has, at its upper end, a yoke 15 through which the lever 12 passes, said lever 12 resting upon the bottom of the yoke when the valve 1 is fully closed, and the sector 3 of the lever 2 is at its lowest point. The top of the yoke 15 carries a nut to which is adapted a screw stem 16, to the lower end of which is swiveled a block 17 vertically guided in the yoke 15 and carrying, by preference, a pointer 19 which coöperates with a graduated scale on the yoke. When the block 17 is depressed so as to bear upon the lever 12, the full lifting movement of the latter will be imparted to the valve 1, but by raising the block 17 to any desired extent, that portion of the upward movement of the lever 12 until it contacts with the block will be lost so far as regards the lift of the valve stem and the extent of opening of the valve 1 will be correspondingly reduced, the screw stem 16 providing for a very delicate adjustment of the contact block 17 so as to provide for slight differences in the extent of opening of the valve, which differences are indicated by the position in respect to the graduated scale, of the pointer 19 carried by the contact block 17. As a certain amount of time is required in order to effect the descent of the weighted end of the lever 2, the volume of flow within such period of time will depend upon the extent to which the valve is opened in the first place and this can be roughly regulated by the adjustment of the links 11 or 13, or both, in respect to the lever 12, or more accurately regulated by the adjustment of the contact block 17 in respect to said lever 12.

In the modification shown in Fig. 4, the main lever 2 engages directly with the lost motion device on the valve stem, or it may engage with a similar device on the link 11, if desired.

I claim:

1. In mechanism for controlling the flow of fluids, the combination of a valve, means for regulating the speed of its closing movement, a valve opening device having a throw sufficient to fully open the valve, and means including a lost motion device for varying the movement of the valve in respect to said throw.

2. In mechanism for controlling the flow of fluids, the combination of a valve, means for regulating the speed of its closing movement, a valve opening device having a throw sufficient to fully open the valve, and means for varying the movement of the valve in respect to said throw, said means including a lever connected to said opening device and to the valve, but provided with means including a lost motion device for varying the extent of its movement in respect to the opening device.

3. In mechanism for controlling the flow of fluids, the combination of a valve, means for regulating the speed of its closing movement, a valve opening device having a throw sufficient to fully open the valve, and means for varying the movement of the valve in respect to said throw, said means comprising an adjustable lost motion connection between the opening device and the valve stem.

4. In mechanism for controlling the flow of fluids, the combination of a valve, means for regulating the speed of its closing movement, a valve opening device having a throw sufficient to fully open the valve, and means for varying the movement of the valve in respect to said throw, said means comprising a device connected to the opening device, but having an adjustable lost motion connection with the valve stem.

5. In mechanism for controlling the flow of fluids, the combination of a valve, means for regulating the speed of its closing movement, a valve opening device having a throw sufficient to fully open the valve, and means for varying the movement of the valve in respect to said throw, said means comprising a yoke on the valve stem, an adjustable contact block carried by said yoke, and a lever connected to the opening device and engaging the yoke and block to impart movement to the valve stem.

6. In mechanism for controlling the flow of fluids, the combination of a valve, means for regulating the speed of its closing movement, a valve opening device having a throw sufficient to fully open the valve, and means for varying the movement of the valve in respect to said throw, said means comprising a yoke on the valve stem, an adjustable block carried by said yoke, and a pointer on said block.

7. In mechanism for controlling the flow of fluids, the combination of a valve, means for regulating the speed of its closing movement, a valve opening device having a throw sufficient to fully open the valve, and means for varying the movement of the valve in respect to said throw, said means comprising a yoke on the valve stem, an adjustable block carried by said yoke, a lever engaging said yoke and block and serving to impart movement to the valve stem, and a pointer on said block.

In testimony whereof, I have signed my name to this specification, in the presence of two subscribing witnesses.

HARRY G. W. OTT.

Witnesses:
KATE A. BEADLE,
HAMILTON D. TURNER.